United States Patent [19]

Neumann

[11] 3,834,131
[45] Sept. 10, 1974

[54] ROLLER WEB FILTER FOR PURIFICATION OF GAS

[75] Inventor: Gerhard Max Neumann, Berlin, Germany

[73] Assignee: Delbag Luftfilter Gesellschaft Mit Beschrankter Haftung, Berlin, Germany

[22] Filed: Sept. 13, 1972

[21] Appl. No.: 288,867

[30] Foreign Application Priority Data
Sept. 14, 1971 Germany..........................354206

[52] U.S. Cl.......................... 55/354, 55/484, 55/501
[51] Int. Cl.............................................. B01d 46/22
[58] Field of Search............................ 55/351–354, 55/483, 484, 501; 242/67.3

[56] References Cited
UNITED STATES PATENTS

| | | | |
|---|---|---|---|
| 1,402,101 | 1/1922 | Smith | 55/354 |
| 3,003,582 | 10/1961 | Palmore | 55/354 |
| 3,259,329 | 7/1966 | Krause | 55/501 |
| 3,276,191 | 10/1966 | Revell | 55/354 |
| 3,280,539 | 10/1966 | Parrott | 55/354 |
| 3,350,856 | 11/1967 | Revell | 55/354 |
| 3,359,709 | 12/1907 | Revell | 55/354 |
| 3,364,662 | 1/1968 | Revell | 55/354 |
| 3,467,797 | 9/1969 | Revell | 55/354 |
| 3,552,101 | 1/1971 | Papp | 55/354 |

Primary Examiner—Frank W. Lutter
Assistant Examiner—David L. Lacey
Attorney, Agent, or Firm—Watson, Cole, Grindle & Watson

[57] ABSTRACT

A roller web filter for filtering gases particularly air in an air conditioning plant, wherein reeling up and unreeling rollers are provided for the filter web and supporting grids situated at either side of the filter web and between the rolls. The roller web filter comprises a fitting frame consisting of angle sections in the form of a double U-rail, forming a separate installation unit and receiving the sealing sections situated at either side of the filter web, the supporting grids and the deflecting rollers for the filter web. The reeling and unreeling rolls, driving assembly for the filter web and the carrying element for the sheathing cowl may be bolted or screwed to the frame.

10 Claims, 31 Drawing Figures

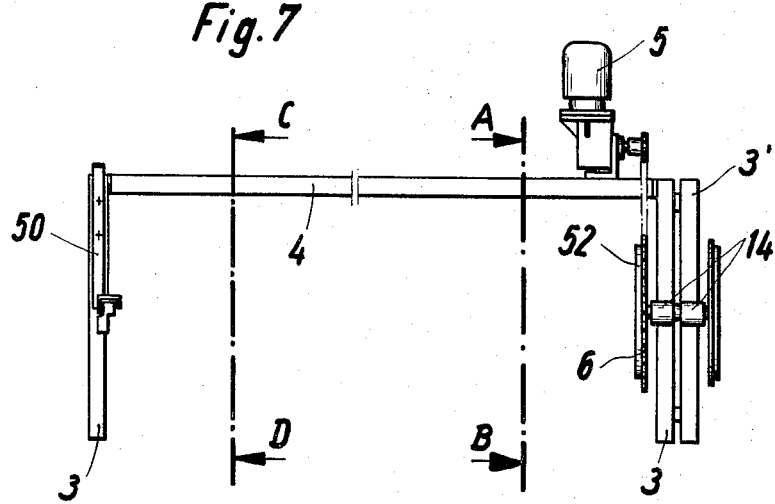
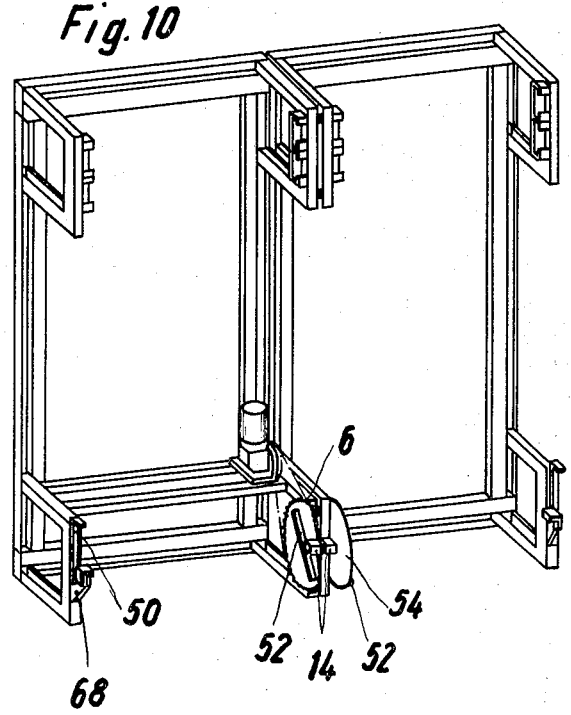

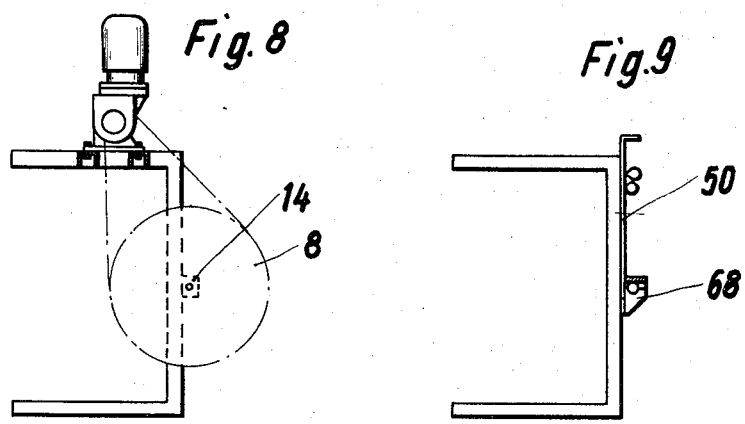
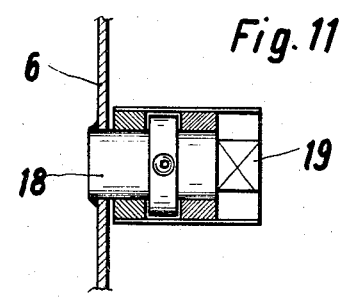
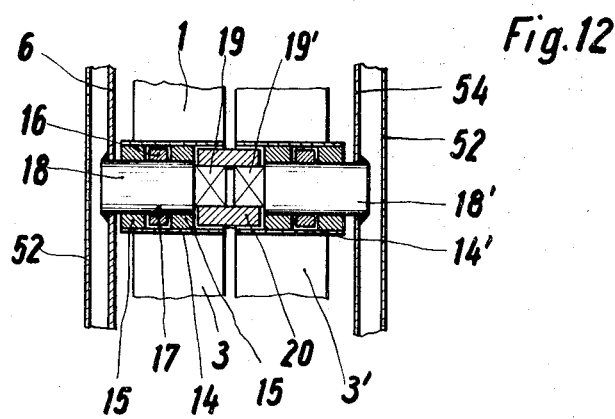

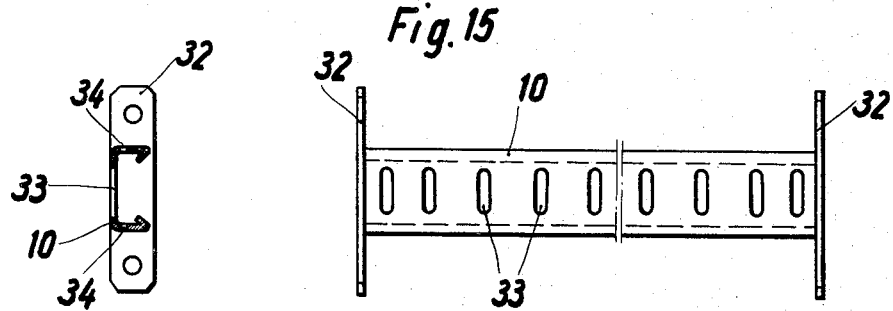
Fig. 15
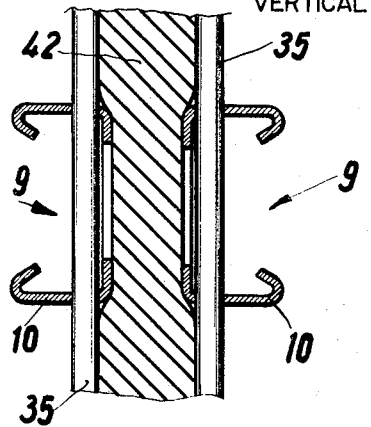
Fig. 16 VERTICAL
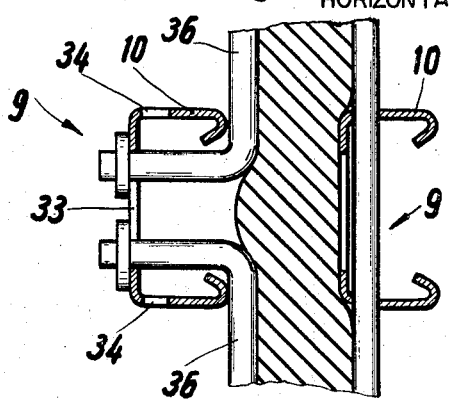
Fig. 17 HORIZONTAL
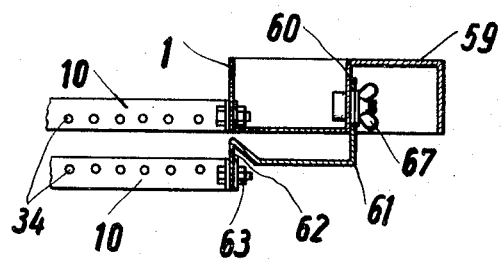
Fig. 18

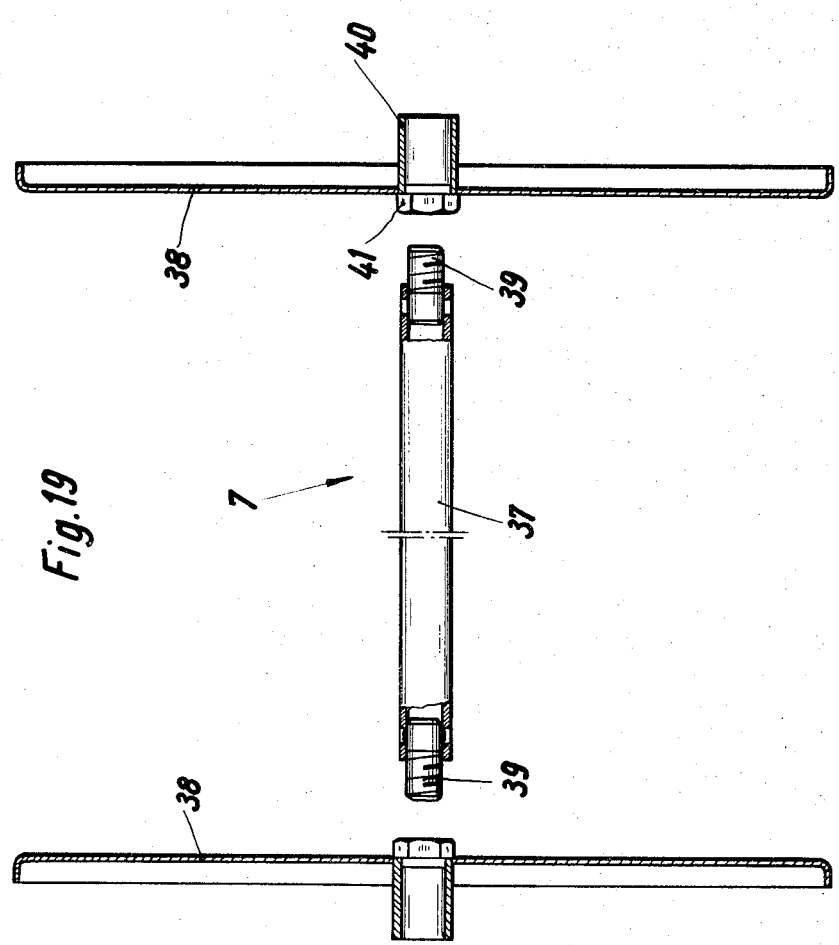

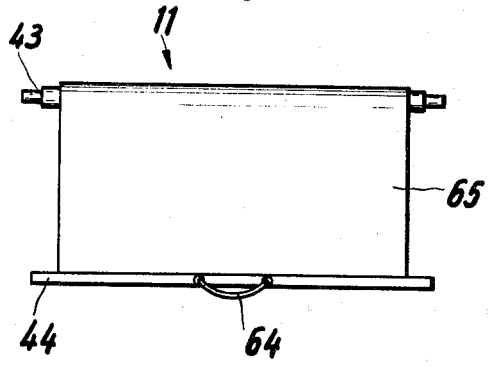
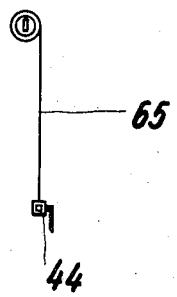
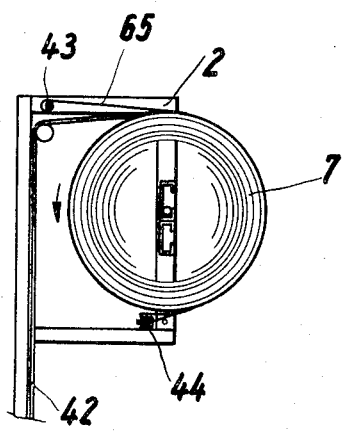
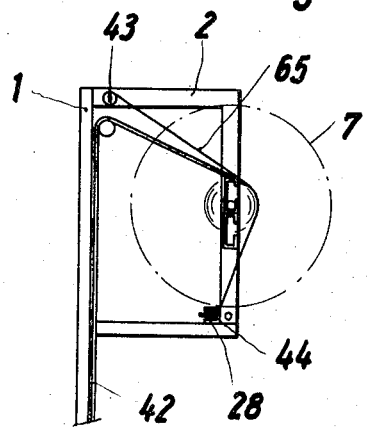

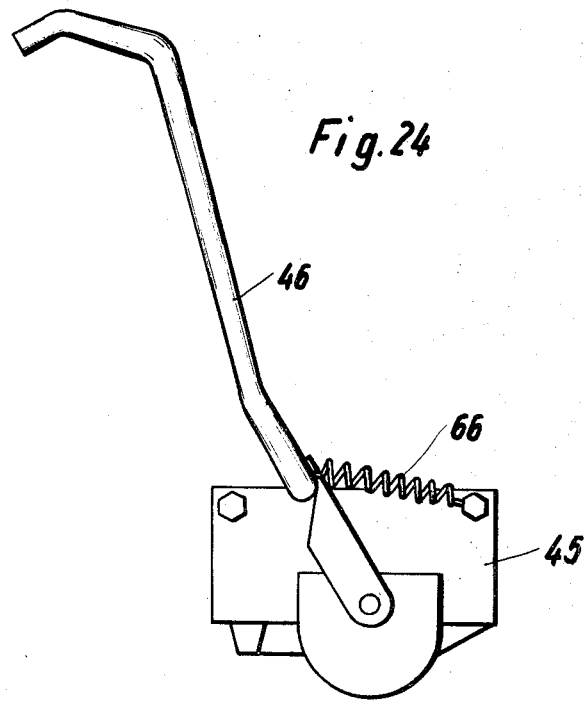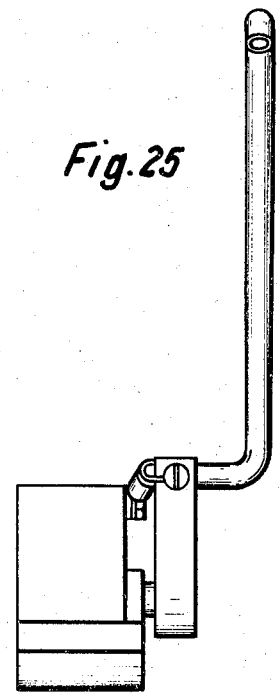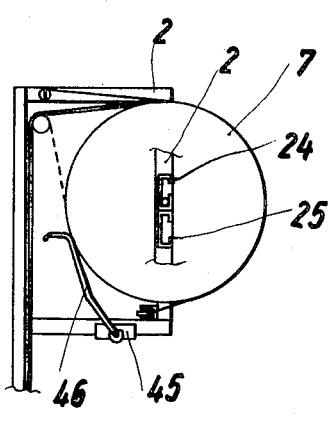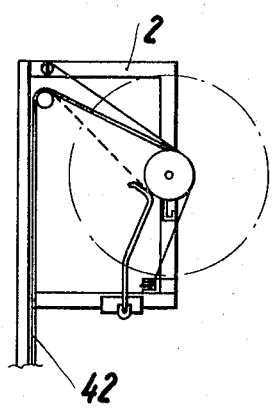

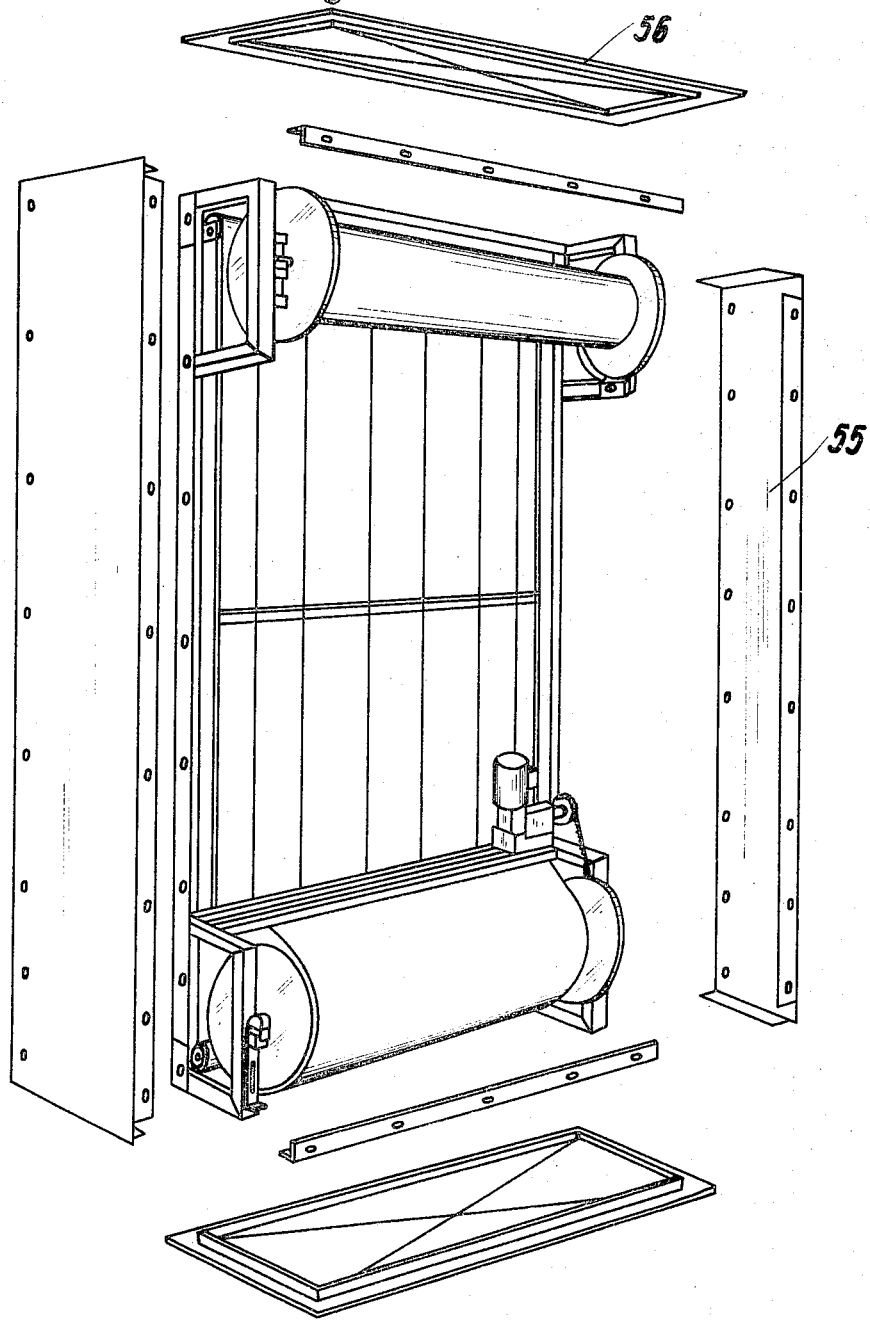

ROLLER WEB FILTER FOR PURIFICATION OF GAS

BACKGROUND OF INVENTION

The invention relates to a roller web filter employed for the purification of gases.

Roller web filters are known per se. They are employed for purification of atmospheric air, for example in air conditioning plants, and are commonly installed in a wall or partition aperture. They comprise an upper unreeling roll and a lower winding roll entrained intermittently by a driving unit, which pulls the filter web over the filter surface situated between the two rolls. The filter web is held ambilaterally by supporting grids situated between the rolls, to prevent bulging out of the web in the filter area. So that a roller web filter of this nature may be installed in a wall aperture in separate stages, without incurring the risk of damaging or soiling the important functional parts of the roller web filter, it is already known that a fitting frame may be incorporated, which forms a separate unit and receives the supporting grids and deflecting rollers for the filter web, on which a carrying element receiving the unreeling and winding rolls, the driving unit for the filter web and the sheathing cowl, may be fastened by screwed connections. To this end, the fitting frame may be inserted into the wall aperture as a separate unit; the carrying element may be screwed to the fitting frame after the wall plastering operation, thereby avoiding damage or soiling of the functionally important parts accommodated in the carrying element. The known roller web filter allows of comparatively effortless reeving of the filter web, by virtue of the fact that the unreeling roll is initially suspended in a lower reeving position on the carrying element for reeving purposes, and may be transferred to the actual upper operating position after completion of the reeving operation. Moreover, the known roller web filter offers the possibility of coupling one or more adjacent roller web filters to the driving unit of the first roller web filter. Thanks to the design of the bearings receiving the winding roll, it is possible moreover in the case of the known roller web filters, to perform a rapid and effortless replacement of the full winding roll. In the case of the known roller web filter, the carrying element fastenable on the fitting frame is itself constructed as a closed frame wherein the aforesaid functionally important parts are to be arranged and secured.

SUMMARY OF THE INVENTION

An object of the invention is the improvement of this known roller web filter in such manner that an universally applicable roller web filter is produced, which may be manufactured in robust lightweight form with minimum expenditure on materials, overheads and labor, which may be assembled in simple and foolproof manner on the premises, even by untrained personnel.

According to the invention, this problem is resolved by virtue of the fact that the inwardly located longitudinally directed middle webs of the fitting frame each have fastened to them two opposed flanges employed to receive the upper and lower deflecting rollers, that the carrying element consists of four U-shaped bearers of identical dimensions which are formed by sectional rails and whereof the free lateral flanges may be fastened to the longitudinally directed rear webs of the fitting frame, the bearers employed for reception of the unreeling roll each having two C-section bearings situated on the inwardly situated lateral webs of their middle limb, which are employed to secure the unreeling roll in its lower reeving positions and an upper operating position, and which are symmetrically positioned with respect to the middle of the limb, and the bearers for the winding and unreeling rolls carry pivot bearings which inable rotational movement of the two reels intended for the roll spindle and the chain sprocket of the driving assembly and projecting from their middle limbs, that a frame intended for reception of the driving assembly and formed by two parallel sectional rails of the bearer which are interconnected at their extremities by straps is incorporated, whereof the straps may be screwed to the inwardly situated lateral webs of the upper bearer limbs, and that the sheathing cowl consists of an essentially known roller blind, whereof the spring-loaded spindle is received in slot-like recesses of the inwardly situated lateral webs of the one bearer limb, and whereof the dropping bar is releasably secured in brackets or the like of the other bearer limb. Thanks to the application of the same U-section for the bearers and the carrying frame of the driving assembly, it is merely necessary to produce a single size of U-section with appropriate rolling mills, from which the aforesaid parts are assembled on a production line with optimum saving of material. Thanks to the fact that the four bearers required have identical dimensions, production is extensively simplified. The bearers for the unreeling roll should be employed in symmetrical arrangement for both sides of the unreeling roll, whereas the bearers for the winding roll need merely be equipped with different bearings. In the disassembled state, the web air filter is largely pre-assembled, so that but few screwing operations only are needed on the premises, which may be performed rapidly by unskilled labor. Since it is merely necessary to insert the required fastening screws into the bores of the individual parts produced by the manufacturers. The pre-assembled individual parts possess minimum dimensions, allowing of small storage space and space-saving despatch in several packaging units. After the fitting frame has been set into the wall, it is merely necessary to screw the four bearers to the fitting frame, to insert the receiving frame for the driving assembly between the bearers for the winding roll, thereby providing sufficient rigidity to allow the driving assembly to be untwistably secured on the carrying frame. The roller web filter is ready for operation after suspension of the roller blind and of the filter web roll. Thanks to their small dimensions, the pre-assembled bearers and the other parts may be passed through electrophoretic baths for the purpose of surface treatment, without resulting in an unfavourable scoop effect as a consequence of disadvantageous profile deformation.

Furthermore, the driving chain sprocket may be equipped at its end side with a coupling element for the adjacent cheek plate of the winding roll which is fastened on one extremity of a shaft stub whose other extremity carries a square shank, the bearer supporting the shaft stub consisting of a square-section tube wherein are secured two spaced-apart square slide-bearing discs or plates between which is situated a setting ring which may be coupled to the shaft stub by means of a radially positioned grub screw, that the adjacent bearing of a contiguous web filter to be coupled to the driving assembly is constructed in the same manner, an entraining plate equally bearing a coupling element for the adjacent cheek plate of the coordinated winding roll being fastened on the free extremity of the shaft stub, and the two shaft stubs being arranged to be connectible by means of a coupling sleeve engaging over both their square extremities, and that the other bearing of the winding roll comprises an essentially known locking element which frees the spindle of the winding roll upon being released. The bearing for the sprocket, is intended to be an uncomplicated structure, by being maintenance-free, having a reliable mode of operation, which allows of easy coupling of an adjacent roller web filter; a square-ended spanner or crank also allows of simple manual operation in case of failure of the driving assembly, after release of the chain, or else if motor drive is undesirable in any event.

Another optional feature of the invention consists in that the spindle of the unreeling roll is wrought as a tube, whereof each extremity has fastened in it a screw threaded bolt or stud, and in that the two cheek plates are each secured on a shaft stub acting as a pivot pin and equipped with an impact or stop nut. The cheek or end plates of the unreeling roll may be separated by unscrewing from the tubularly wrought spindle, so that they remain on the spot on the occasion of a replacement, and may be screwed on to a new reeling or winding roll supplied without cheek plates.

Another optional feature of this invention consists in that the securing rails intended for the bars of the supporting grids and fastenable on the fitting frame consist of C-profile section which has its lateral webs equipped with perforations situated close to the middle web and intended for reception of full-length straight grid bars for a vertically extending web filter, and in its middle web has an elongated hole extending at right angles to the lateral webs, for reception of grid bars wrought with right-angle bends for a web filter set up on edge. Thanks to these securing rails, it is possible to employ the roller web filter standing in vertical as well as on edge position. In the latter case, the grid bars equipped with right-angle portions of the one supporting grid enter between the bars of the other supporting grid, so that the filter web is locked transversely to the direction of entrainment by means of undulant salients, thereby preventing slipping of the filter web at right angles to the direction of the air flow.

It is preferable furthermore that the one supporting grid is fixedly arranged in the fitting frame and that the other supporting grid is releasably and displaceably fastened on the sealing sections.

The sealing sections are adjustably fastened on the fitting frame in known manner, to allow for adaptation to filter webs of different thickness. The releasable fastening of the one supporting grid on the sealing sections has the purpose of allowing the securing rails to be installed turned through 180° for a "recumbent" position of the roller web filter.

It is of significance moreover that the lower lateral web of the one bearer of the unreeling roll has a switch fastened to it, which carries a sensing lever bearing under spring action on the surface of the reeled filter web, the two spring extremities of the tension spring acting direct on the switch and on the sensing lever.

It is preferable moreover that the bearers for the reeling rolls be formed as C-shaped castings which at the middle of the surface of the middle web bear semicircular recesses for the bearings of the reeling roll.

Finally, it is also significant that for installing the web on a ventilating duct, the four peripheral sides may be closed in by covering plates or panels fastenable on the fitting frame and bearers.

The roller web filter according to the invention is universally applicable and may be employed in vertically or horizontally extending position. It may also be installed on a ventilating duct and may also be inserted in optional position into the casing of a ventilating duct so that the roller boxes do not project with respect to the ventilating duct but terminate flush with its sides. Thanks to its structure and to the design of the bearings, the inventive roller web filter is practically maintenance-free and has great durability. The covering required for the upper or lower filter roll optionally consists of a known roller blind which can automatically follow the web roll and constantly keeps the latter enflanked in dust-proof manner. The bulky and expensive covering cowl required until now is eliminated thereby.

The accompanying drawings show an exemplifying form of embodiment of the roller web filter according to the invention.

BRIEF DESCRIPTION OF THE DRAWINGS

FIG. 7 is a front view of the bearers for the reeling roll, with the driving assembly;

FIG. 8 is a side view corresponding to line A–B of FIG. 7;

FIG. 9 is a side view corresponding to line C–D of FIG. 7;

FIG. 10 is an illustration in perspective of two roller web filters coupled to each other;

FIG. 11 is a sectional illustration of the coupling bearing;

FIG. 12 is an illustration of a portion of the frame corresponding to that shown in FIG. 1, with two bearings coupled to each other;

FIG. 15 is an illustration of the securing rail for the supporting grids in frontal and lateral elevation;

FIG. 16 is a partial illustration of the supporting grids for a vertically standing roller web filter;

FIG. 17 is a partial illustration of the supporting grids for a roller web filter standing on edge;

FIG. 18 is a diagrammatical illustration of the cross-section of the fitting frame with sealing section;

FIG. 19 is an illustration of the unreeling roll;

FIG. 20 is an illustration of the roller blind in frontal and lateral elevation;

FIG. 21 is a side view corresponding to FIG. 20;

FIGS. 22 and 23 are illustrations of the roller blind on the unreeling roll;

FIGS. 24 and 25 are illustrations of the sensing lever in frontal and lateral elevation;

FIGS. 26 and 27 are illustrations of the sensing lever on the unreeling roll;

FIG. 31 is an illustration in perspective of the roller web filter intended for installing on an air duct.

DESCRIPTION OF THE PREFERRED EMBODIMENTS

Figure 1:
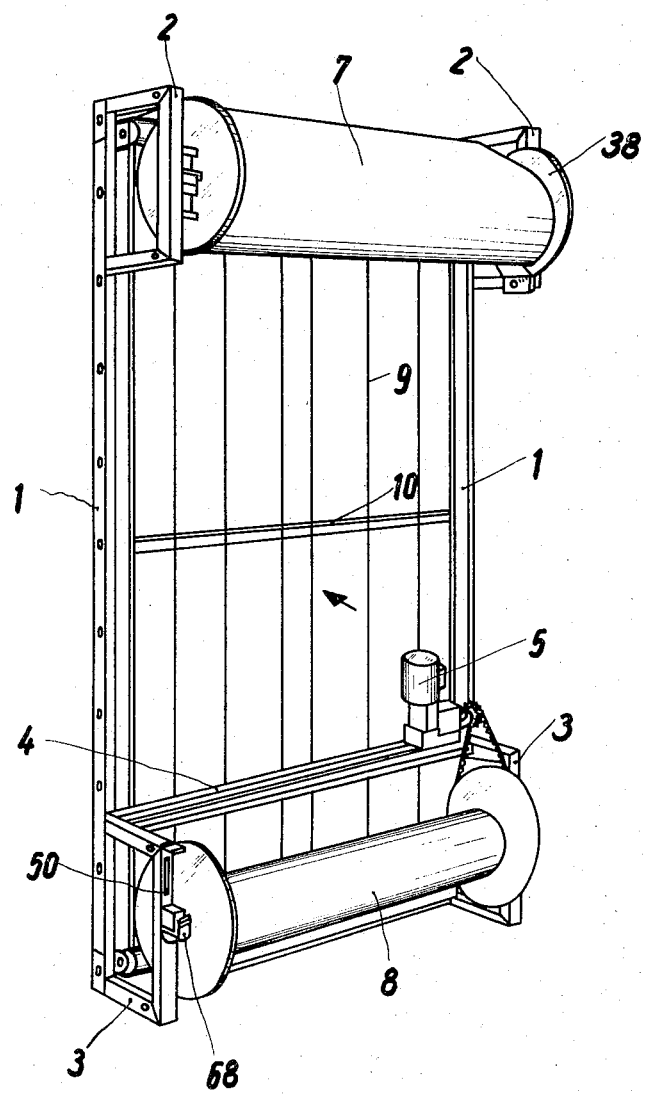
FIG. 1 is an illustration in perspective of the roller web filter with air being ducted in the direction of the arrow depicted.
Figure 2:
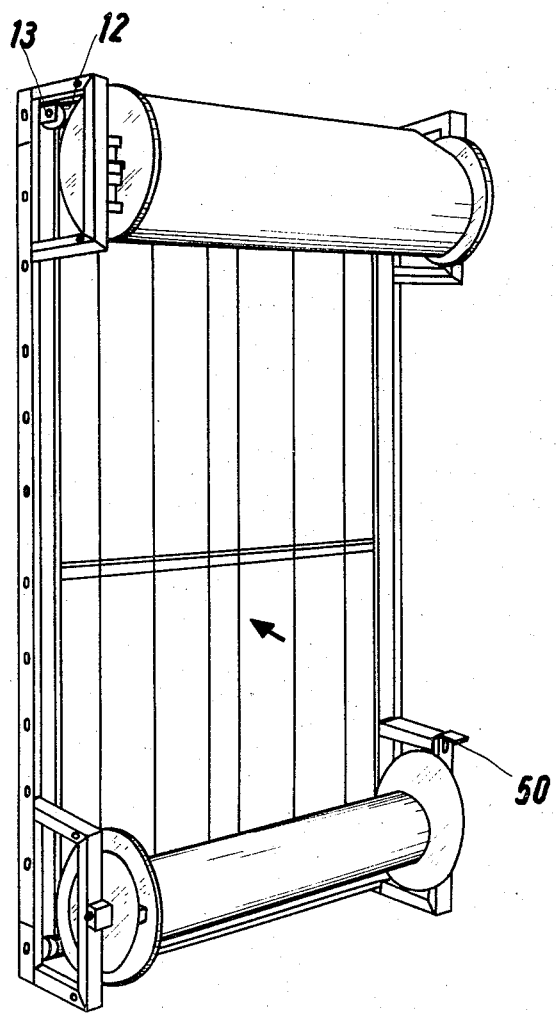
FIG. 2 is an illustration corresponding to FIG. 1, without the driving assembly and supporting frame.
Figure 3:
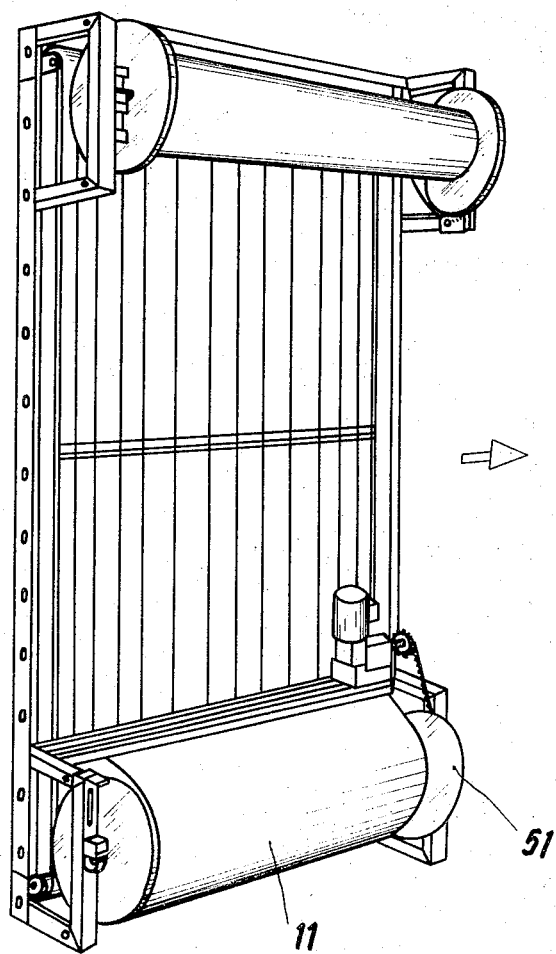
FIG. 3 is an illustration corresponding to FIG. 1, with through-flow according to the oppositely directed arrow.

FIGS. 1 to 3 show the roller web filter according to the invention. It consists of a frame composed of double U-shaped profile sections 1, as apparent in particular from FIG. 18. Two U-shaped bearers 2 for the unreeling roll 7 are fastened at the upper extremity of the fitting frame, and two U-shaped bearers 3 for reception of the reeling roll 8 are fastened at the lower extremity of the same. Between the upper horizontal limbs of the two bearers 3 is fastened a supporting frame 4 which receives a motor 5 with a gearing mechanism. The spindle of the reeling roll 8 has arranged on it a chain sprocket 6 from which a chain leads to the pinion of the gear mechanism. Supporting grids 9 whose rods pass through securing rails 10, are fastened in the fitting frame. A roller blind 11 situated on the unreeling roll 7 in FIGS. 1 and 2, and on the reeling roll 8 in FIG. 3, is incorporated to cover the filter web roll 7 or 8 which is to be protected.

Figure 4:
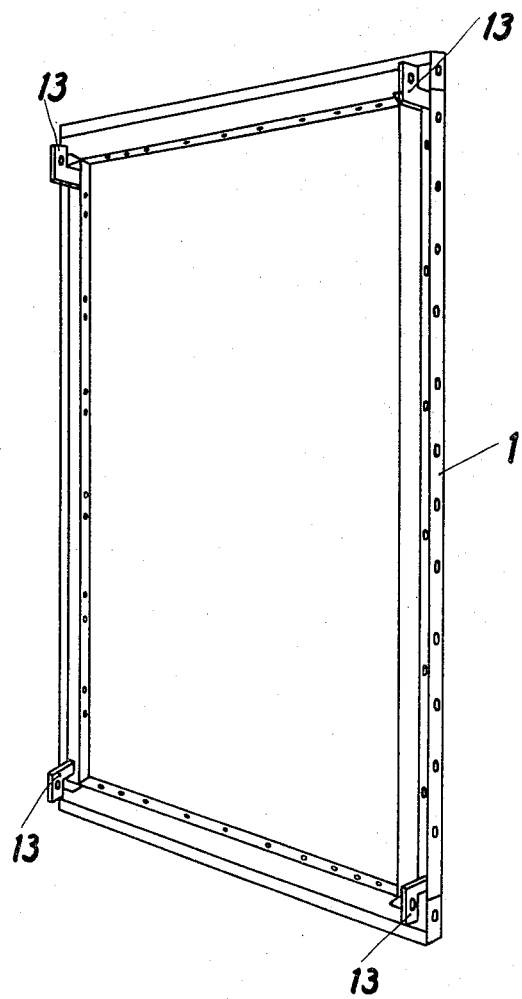
FIG. 4 is an illustration in perspective of the fitting frame.
Figure 5:
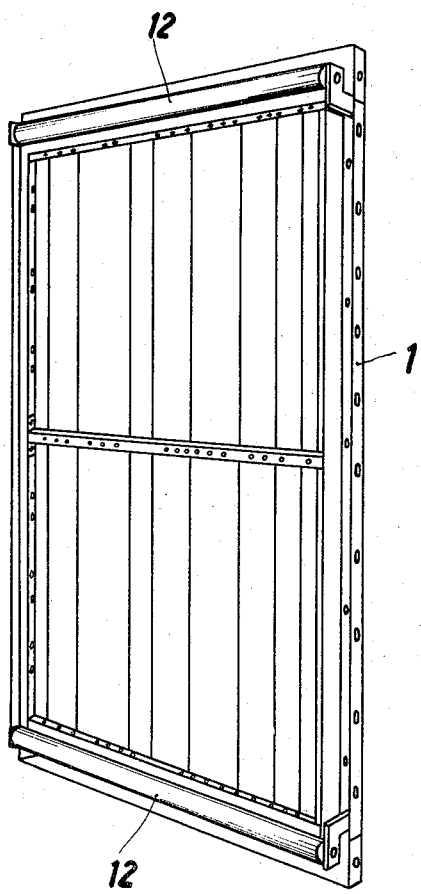
FIG. 5 is an illustration corresponding to FIG. 4, with deflecting rollers inserted.

FIGS. 4 and 5 show the fitting frame consisting of the profiled sections 1, brackets 13 projecting at the top and bottom, which are employed to receive the deflecting rollers 12, being fastened on the middle webs 60 (FIG. 18) of the vertical profiled sections 1.

Figure 6:
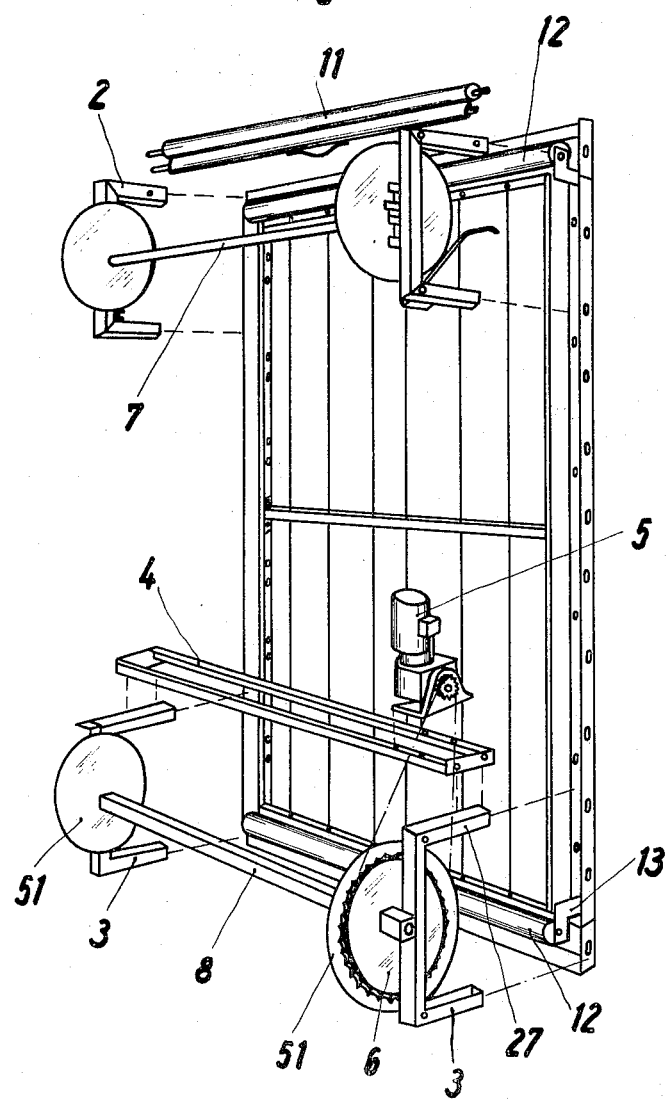
FIG. 6 is an exploded view corresponding to FIG. 1.

As apparent from FIG. 6, the fitting frame, the bearers 2, 3, the frame 4, the driving assembly 5, the unreeling roll 7, the reeling roll 8 and the roller blind 11, are delivered separately to the site, at which the fitting frame is first set into the wall opening, whereupon the bearers 2, 3 are fastened on the fitting frame by simple screwed connections, the frame 4 is fitted by screwing between the upper limbs of the bearers 3, the driving assembly 5 is bolted to the frame 4, and the roller blind 11 is hooked in. The assembly is thus completed on the premises and the roller web filter is ready for use.

FIGS. 7 to 10 show the coupling of two adjacently situated fitting frames to each other; on the right-hand side of bearer 3 is situated the bearing 14 intended for reception of the chain sprocket 6, whereas the bearing 68 equipped with a securing or locking element 50 is fastened on the left-hand side of bearer 3. After opening the locking device 50, the reeling roll 8 may be lifted out of the bearing 68 and withdrawn from the chain sprocket 6. FIGS. 7 and 10 show two roller web filters coupled to each other; the coupling bearing is shown in FIGS. 11 and 12. The chain sprocket 6 is fastened on the one extremity of a shaft stub 18 whose other extremity bears a square shank 19. The bearing consists of a square section tube 14, wherein are secured two square spaced-apart bearing plates 15 comprising a bore for the shaft stub 18 and consisting of friction bearing material. Between the two bearing plates 15 is situated a setting ring 16 wherein is situated a radially directed grub screw 17. To locate the shaft stub 18 in the bearing against axial displacement, the shaft stub 18 is inserted through the bearing plates and the setting ring 16, whereupon the grub screw 17 is brought into engagement with the shaft stub 18 by screwing through a hole situated in the square-section tube 14, so that the setting ring 16 turning with the shaft stub 18 secures the shaft stub 18 against axial displacement. To couple two adjacent bearers 3, 3' of two roller web filters to each other, a coupling sleeve 20 is threaded over the square shank 19, and the square shank 19' of the adjacent bearing is inserted into the coupling sleeve 20. The reeling rolls 8 of both adjacent roller web filters are driven by the chain sprocket 6 in this manner. On the end side of the chain sprocket 6 is secured a web-like coupling element 52 which, as apparent from FIG. 6, engages in a companion element of the cheek plate 51 of the reeling roll 8, said companion element not being illustrated, so that the reeling roll 8 is also turned during rotation of the chain sprocket 6. The shaft stub 18' of the adjacent bearing has entraining plate 54 which equally bears a coupling element 52 which drives the reeling roll 8 of the adjacent roller web filter in the same manner.

Figure 13:
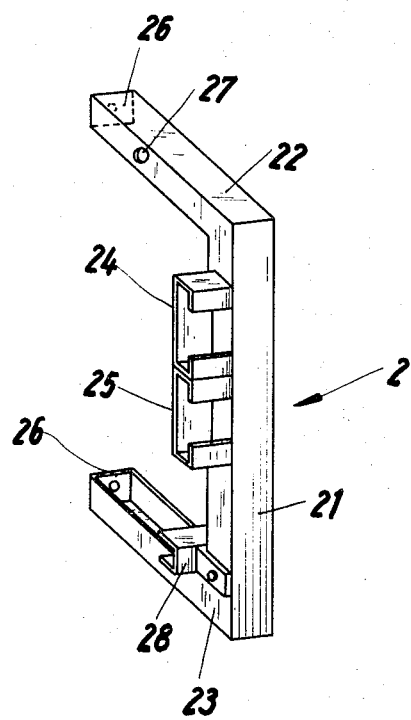
FIG. 13 is an illustration in perspective of the bearer for the unreeling roll.

FIG. 13 shows an upper bearer 2 for the unreeling roll 7. The bearer 2 consists of a U-section, like the bearer 3, and has a middle limb 21, an upper horizontal lateral limb 22 and a lower horizontal lateral limb 23. The extremities of the lateral limbs 22, 23 are closed off by a terminal flange 26 which has a bore for bolting to the fitting frame. C-profile sections 24 and 25 in mutual contact are fastened by spot-welding on a lateral web at the middle of the lateral limb 21, so that the junction between the two sections 24, 25 is situated at the middle of the middle limb 21. To suspend the unreeling roll 7, the same is first placed in the lower section 25; it is then situated in the reeving position. Upon completing the reeving operation, the unreeling roll 7 is lifted out of section 25 into section 24, wherein it is situated in the operating position. The bearers 2 may be arranged symmetrically on the left-hand as well as right-hand sides of the fitting frame. In the upper limb 22 is situated a slot-like opening 27 for reception of the spring-loaded spindle of the roller blind 11, whereas the lower lateral limb 23 has an U-shaped bracket 28 for reception of the dropping bar of the roller blind 11.

Figure 14:
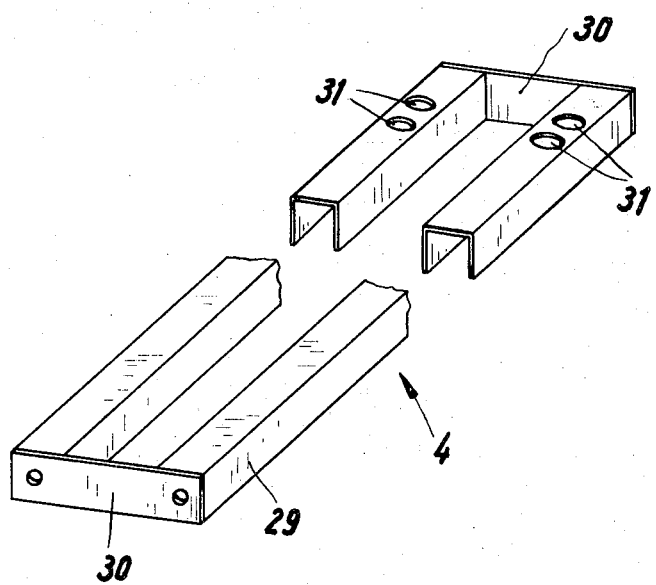
FIG. 14 is an illustration in perspective of the frame for the driving assembly.

FIG. 14 shows the frame 4 employed to receive the driving assembly 5. This consists of two mutually parallel profiled sections 29 of identical profile, as employed for the bearers 2, 3. The profiled bars 29 are connected at their extremities by flanges 30 which, as apparent from FIG. 6, are fastened by bolting to the inner webs of the upper limb 27 of the bearer 3. The middle webs of the profiled bars 29 are endowed with transversely directed elongated holes 31, which are employed to fasten the driving assembly 5 and to establish the chain tension required.

FIGS. 15 to 18 show the form and arrangement of two securing rails 10 for the two supporting grids 9 enclosing the filter web 42 between them. As apparent from FIG. 15, each securing rail 10 is wrought as a C- profile section and at its two extremities bears fastening lugs 32 whereby the one rail 10 is bolted to the inner webs of the fitting frame, whereas the other rail 10 is fastened to the two sealing sections 61 as apparent from FIG. 18. The securing rail 10 has bores 34 wrought close to the middle web in their lateral webs, and an elongated hole 33 in its middle web. FIG. 16 shows the arrangement of the two securing rails 10 for a vertically standing roller web filter. To this end, full-length supporting bars 35 are situated in the bores 34 of the securing rail 10. If the roller web filter is to be arranged lying on edge, i.e. in a horizontal position, for example within the duct of an air-conditioning plant, the one securing rail 10 is symmetrically secured in the fitting frame or on the sealing sections 61, as apparent from FIG. 17.

No full-length supporting bars or rods 35 are employed in this case, an upper and lower supporting rod being employed on the contrary, which have right-angled bent-over portions and are inserted in the elongated hole 33 of the rail 10. Since the supporting bars 35 of the one securing rail and the supporting bars 36 of the other securing rail are staggered with respect to each other, the supporting bars 36 penetrate into the space between the supporting bars 35, so that the filter web 42 is undulantly clamped between the supporting bars 35 and 36, thereby preventing slipping of the filter web. As apparent from FIG. 18, the sealing section 61 is displaceable in an elongated hole of the middle web 60 of the fitting frame, and is rendered immobile by means of a screw 67, so that the sealing section 61 may be adjusted to different thicknesses of the filter web 42. At its extremity, the sealing section 61 has a limb 62 whereon the one securing rail 10 is fastened by means of nuts 63. In this case too, an elongated hole may be wrought in the limb 62, so that the securing rail 10 may be displaceable with respect to the sealing section 61.

FIG. 19 shows the unreeling roll 7, which consists of a tube 37 acting as a spindle. Projecting screw-threaded studs or bolts 39 are fastened in the two extremities of the tube 37. The two cheek plates 38 are fastened on a shaft stub 40 which carries a stop nut 41. For replacement of the unreeling roll 7, the two cheek plates are removed from the hollow spindle 37 and are screwed to another hollow spindle 37 equipped with the filter web 42; the cheek plates 38 may always remain at the place of operation in this manner.

FIGS. 20 to 23 show the form and arrangement of the roller blind 11. The roller blind 11 consists, in manner known per se, of a strong weatherproof and tear-resistant sheet 65 which is wound on a spring-loaded spindle 43. The dropping bar 44 having the handle 64 is fastened to the extremity of the sheet 65. As apparent from FIGS. 22 and 23, the spring-loaded spindle 43 is inserted into the slot-like openings 27 shown in FIG. 13; the sheet 65 is then pulled by means of the handle 64 over the reeling roll 7 and the dropping bar 44 is inserted into the securing device 28. As apparent from FIG. 23, the roller blind is always kept in contact by means of the spring-loaded spindle 43 with the filter web 42 received on the unreeling roll 7, so that a continuous and dustproof protection is assured for the unreeling roll 7. If the roller blind 11 must be arranged on the reeling roll, in case of the oppositely directed flow of air, the slot-like openings are situated in the lower limb of the bearer 3, and the securing device 44 is situated on the upper limb of the bearer 3.

FIGS. 24 to 27 show the form and arrangement of the sensing lever. The sensing lever 46 is arranged on a switch 45 and is acted upon by a tension spring 66 which acts at one extremity on the switch 45 and at the other extremity on the sensing lever 46. As apparent from FIGS. 26 and 27, the switch 45 is fastened on the lower limb of the bearer 2, and the sensing lever 46 bears constantly on the periphery of the unreeling roll 7 under the action of its spring 66, and initiates a signal, possibly entailing deactivation of the driving assembly 5, when the filter web 42 has been reeled off the unreeling roll 7.

Figure 28:
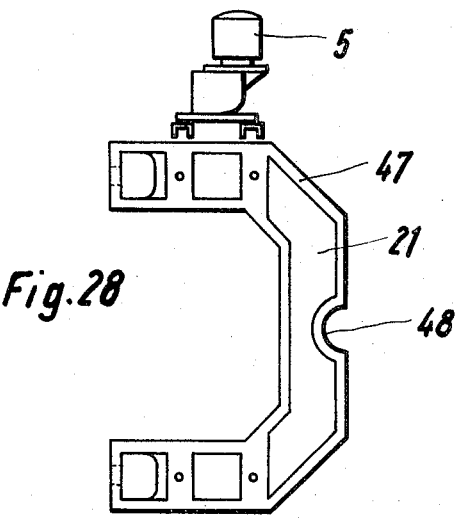
FIG. 28 is an illustration of the cast bearer of the reeling roll.
Figure 29:
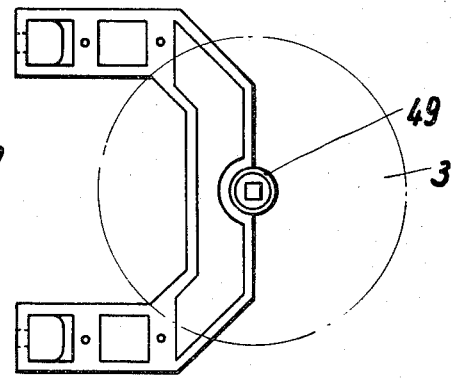
FIG. 29 is an illustration corresponding to FIG. 28, with the bearing for the chain sprocket.
Figure 30:
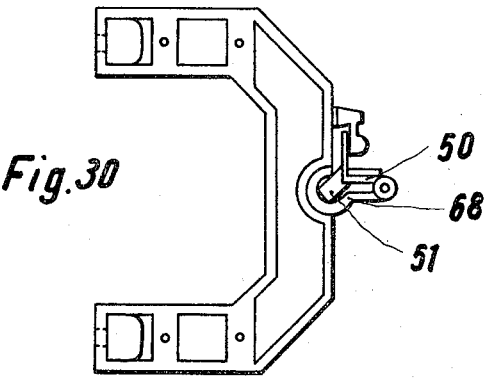
FIG. 30 is an illustration corresponding to FIG. 28, with the other bearing and securing element.

FIGS. 28 to 30 show a bearer for the reeling roll, which consists of an U-shaped casting 47. The middle limb of the casting 47 is endowed at its middle with a semi-circular recess 48 which is intended on the one hand to receive a bearing 49 for the chain sprocket, and on the other hand for reception of the bearing 68 with the locking element 50, which has a tongue 51 preventing an axial displacement of the spindle of the reeling roll 8. When a full reeling roll 8 is to be replaced, the locking element 50 is opened and the reeling roll is withdrawn from the bearing 68 and extracted from the coupling element 52 situated on the one side of the chain sprocket 6, whereupon another empty reeling roll 8 may be inserted.

FIG. 31 shows the inventive roller web filter as an extension to a ventilating duct. To this end, the sides of the roller web filter are boxed in by means of covering plates or panels 55 and 56, by screwing the covering plates to the fitting frame and to the bearers 2, 3. The roller web filter may evidently also be inset into the casing of an air-conditioning plant in a vertical or horizontal position.

I claim:

1. An arrangement for supporting a roller web filter for a gas purification system, the arrangement comprising: a frame with a front and rear side and having two longitudinally extending sections, each being formed of a double U-shaped rail, and two lateral sections interconnecting the longitudinal sections, so as to form an installation unit; an unreeling roll for supporting the web filter in its unreeled condition; a reeling roll for receiving the filter web as it is unreeled; supporting grids connected between said longitudinal sections at a position spaced from said lateral sections for guiding the filter web as it passes between said reeling roll and said unreeling roll; sealing sections arranged on said frame so as to be positioned on opposite sides of the filter web; two deflection rollers, each positioned adjacent a respective one of said reeling roll and said unreeling roll for guiding the filter web; a drive assembly for driving the filter web from said unreeling roll to said reeling roll; a plurality of flanges, each attached on a respective end of said longitudinal sections adjacent said lateral sections, each pair of flanges on respectively opposite ends of one of said lateral sections being arranged for receiving a respective one of said deflection rollers; four U-shaped barrier sections, each positioned on the rear side of said frame at a respectively opposite end of said lateral sections and extending along said longitudinal sections, with a first pair of said barriers at one longitudinal end of said frame being arranged for receiving said unreeling roll and said other pair of said barriers at the opposite longitudinal end of said frame being arranged for receiving said reeling roll; first pivot bearings mounted on each of said barriers for said unreeling roll for connecting said unreeling roll to said barriers in a pivotal arrangement; said unreeling roll being arranged on said barriers so as to unreel in a lower reeving operation; second pivot bearings mounted on each of said barriers for said reeling roll for connecting said reeling roll to said barriers in a pivotal arrangement; a roller spindle connected to said second pivot bearings for providing a support for said reeling roll; said reeling roll being arranged on said roller spindle; a drive frame connected to said frame for supporting said drive assembly; a chain sprocket connected between said drive assembly and said roller spindle for enabling said drive assembly to drive said reeling roll; and a sheathing cowl including a spring loaded spindle, a roller blind mounted on said spring loaded spindle, said roller blind being arranged for passing through a slot-like recess in a lateral member extending between one pair of said barriers and having a dropper bar which is releasably secured to said pair of barriers.

2. An arrangement as defined in claim 1, further comprising a cheek plate connected to said reeling roll at one end thereof, a shaft stub connected to one of said second pivotal bearings at one end thereof and having a square shank at its other end; and wherein said cheek plate is connected to said shaft stub, said second pivotal bearing carrying said shaft stub has a square section tube, said driving chain sprocket is connected to said cheek plate for coupling said drive assembly to said reeling roll, the other said second pivotal bearings of said reeling roll has a locking element mounted thereon, which releasably secures said spindle of said reeling roll to said bearing, and said first pivotal bearings of said unreeling roll are in the form of C-shaped sections.

3. A roller web filter arrangement as defined in claim 2 further comprising a second said frame, arranged adjacent said first frame, for supporting a second filter web and including a second said reeling roll and a second said unreeling roll mounted on said second frame; a second said shaft stub; two square bearing plates fastened on each said shaft stub; a setting ring connected to said shaft stub between said square bearing plates by a radially arranged grub screw for enabling said second filter web to be coupled to said driving assembly; a second cheek plate connected to said second reeling roll; an entraining plate mounted on said shaft stub for coupling said second cheek plate onto said second shaft stub; and a coupling sleeve connected between said two shaft stubs engaging over both of their said square shanks ends.

4. A roller web filter arrangement as defined in claim 3, further comprising; a second tubular spindle on which said unreeling roll is mounted; a screw threaded member mounted on each extremity of said tubular spindle; two cheek plates mounted on each end of said unreeling roll; and an unreeling shaft stub connected to each of said cheek plates by use of a stop nut and being arranged so as to be connected to said first pivotal bearings for pivotally supporting said unreeling roll.

5. A roller web filter arrangement as defined in claim 4 wherein said support grids includes a plurality of bars; and further comprising at least one securing rail for supporting said bars, said rail being connected to said frame, said rail having a C-shaped profile section and said rail having an elongated hole in its longitudinal face and being arranged to receive right angled end over portions of said grid bars when the web filter is arranged in a horizontal position.

6. A roller web filter arrangement as defined in claim 4, wherein said supporting grid includes a plurality of longitudinally extending rods; and further comprising at least one securing rail connected to said frame, said securing rail having a C-shaped profile section and having in its lateral surface a plurality of perforations, and said supporting rail being positioned approximately in the center of said frame extending in a direction parallel to said lateral sections of said frame and being arranged for receiving said rods in such position when said web filter is arranged in a vertical position.

7. A roller web filter arrangement as defined in claim 6 further comprising a second supporting grid; wherein said first supporting grid is connected to said frame and said second supporting grid is releasably fastened to said sealing sections.

8. A roller web filter arrangement as defined in claim 7, further comprising: a sensing switch connected to the lower lateral member of one of said barriers associated with said unreeling roll, said switch having a sensing lever arranged so as to bear against the surface of the reeled filter web under the action of a tension spring, and said tension spring acting on both said switch and said sensing lever.

9. A roller web filter arrangement as defined in claim 8 wherein said barriers associated with said reeling roll are formed as C-shaped castings and are provided in the middle portion of their center section with semicircular recesses, which recesses constitute said second pivotal bearings for said reeling roll.

10. A roller web filter arrangement as defined in claim 9 further comprising covering plates for enclosing each of the four peripheral sides of said frame for enabling said web filter to be installed on a ventilating duct.

* * * * *